May 13, 1952     B. VONNEGUT     2,596,744
MOISTURE INDICATING INSTRUMENT
Filed Dec. 28, 1949
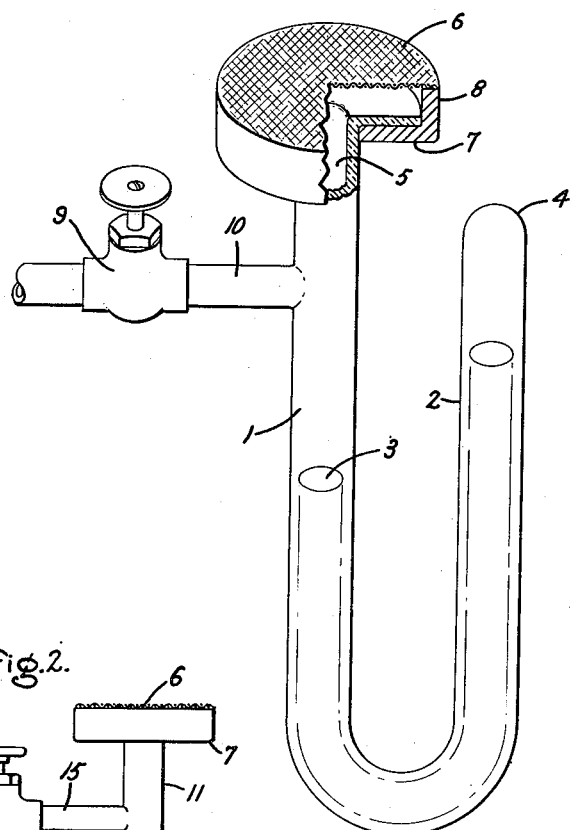
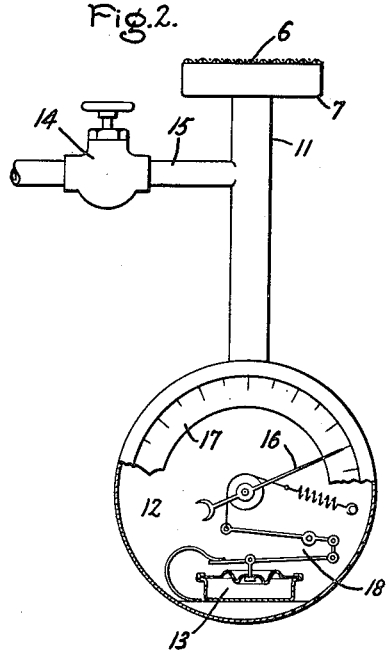
Inventor:
Bernard Vonnegut,
by Paul A. Frank
His Attorney.

Patented May 13, 1952

2,596,744

UNITED STATES PATENT OFFICE 2,596,744

MOISTURE INDICATING INSTRUMENT

Bernard Vonnegut, Alplaus, N. Y., assignor to General Electric Company, a corporation of New York Application December 28, 1949, Serial No. 135,344

12 Claims. (Cl. 73—335)

My invention relates to moisture indicating instruments and more particularly to moisture-indicating instruments often referred to as "hygrometers" for indicating the humidity of an atmosphere.

Most humidity-indicating instruments which have heretofore been devised, such as "dew point" hygrometers and "wet and dry bulb psychrometers" have been relatively complicated and cumbersome instruments necessitating critical adjustment and a sequence of operations before a reading can be taken. These instruments have commonly depended for their operation upon the indirect effects of humidity in an atmosphere, such as for example, upon the dew point or upon the rate or cooling effect of evaporating moisture, or even upon the differential rate of diffusion between water vapor and air through a porous substance. Hygroscopic instruments which depend upon the variation in length of a hygroscopic substance, such as a human hair, are also well known but are usually inaccurate and extremely difficult to calibrate over the normal temperature range. All such indirect indications of humidity are also dependent upon other parameters of the atmosphere, such as temperature and pressure, and must be related to corresponding temperature and pressure tables before the humidity indication can be interpreted.

Accordingly, a principal object of my invention is to provide a simple, rugged, and reliable humidity indicating instrument which is directly responsive only to the amount of moisture in the surrounding atmosphere and which, therefore, provides a direct indication of the absolute humidity of that atmosphere.

A further object of my invention is to provide a humidity-indicating instrument whose indication is comparatively unaffected by normal variations in temperature and pressure of the surrounding atmosphere.

In general, my invention comprises an evacuated pressure measuring instrument, which may conveniently be of the manometer or aneroid type, whose pressure-receiving mouth is covered by a sturdy membrane capable of withstanding the resultant atmospheric pressure and having the property of permeability to moisture while being impervious to gases, such as air. When immersed within a moisture laden atmosphere, the moisture quickly passes through the membrane until inner and outer vapor pressures are in equilibrium, and the resultant vapor pressure within the evacuated pressure instrument causes a displacement of the pressure sensitive element within the instrument which varies directly with the amount of moisture in the external atmosphere.

The novel features which I believe to be characteristic of my invention are set forth with particularity in the appended claims. My invention itself, however, together with further objects and advantages thereof can best be understood by reference to the following description taken in connection with the accompanying drawing in which Fig. 1 is a perspective view, partly in section, of a manometer type pressure-measuring instrument embodying my invention, and Fig. 2 is a front view, partly in section, of an aneroid type pressure instrument embodying my invention.

Referring to Fig. 1, I have shown my invention in conjunction with a pressure-indicating instrument such as a vacuum type manometer 1, well-known in the art, which includes a gas evacuated chamber in the form of a U-shaped tube 2 of glass or any other suitable transparent material. The tube 2 encloses a pressure sensitive element in the form of a liquid 3, preferably non-volatile, such as mercury partially filling the tube 2. One end 4 of the tube 2 is closed while the other open end 5, which constitutes the mouth of the manometer, is completely covered by a membrane 6 to be more fully described below. In order to provide a convenient mount for the membrane 6 across the mouth of the manometer 1, the end 5 of the tube 2 may be flared outward and hermetically sealed to a conforming annular metallic member 7 which has an upwardly turned flange 8 as shown. The membrane 6 may then be securely fastened around the entire rim of flange 8 by any suitable means such as soldering.

Valve means 9, preferably located in an entering tube 10 adjacent the open end 5 of the tube 2, is also provided to enable the evacuation of the gases within the manometer 1. It will be appreciated that evacuation means may be provided which communicate with both legs of the tube 2 if desired, although evacuation may be easily accomplished with one valve, as shown, by merely tilting the manometer until the liquid 3 is entirely within the leg of the manometer adjacent the closed end 4 and then evacuating the remaining portion of the manometer. Alternatively, the entire manometer tube 2 may be completely evacuated and thereafter the liquid 3 passed into the tube 2 through the same valve means 9.

Referring now to Fig. 2, I have shown my invention in conjunction with an aneroid type pressure-measuring instrument. A tube 11 leads to a gas evacuated pressure chamber 12 enclosing a pressure sensitive element in the form of an evacuated collapsible compartment 13. Evacuation of chamber 12 may be accomplished by virtue of a valve 14, preferably located in tube 15, communicating with tube 11. As is well known, in such aneroid pressure instruments the movement of a pointer 16 across a dial 17 is related through a lever system 18 to the amount of constriction of the pressure sensitive compartment 13 due to the surrounding pressure in the chamber 12. The front face of the intrument is preferably transparent in order to permit the movement of pointer 16 to be viewed.

In order to subject the pressure sensitive compartment 13 only to the pressure of the external atmopheric moisture, the mouth of the tube 11 is covered by a semi-permeable membrane 6 in the same manner as the manometer tube 1 of Fig. 1 and the similar construction is indicated by the same reference numerals.

The membrane 6 must, of course, be sturdy enough to withstand the external atmospheric pressure after the pressure chamber has been evacuated, without being impervious to moisture. I have found that one or two layers of very fine wire mesh, as indicated in the drawing, in the order of one hundred lines per inch, is ideally suited as a base for the membrane 6. This wire mesh is then covered with materials which are highly permeable to moisture but relatively impervious to gases such as air. Thin polyvinyl formal plastic films and thin gelatin films, for example, have this desired permeability to moisture but their air leakage is fairly high. The term "polyvinyl formal plastic" as herein employed includes the resinous aldehyde reaction product of a hydrolyzed or partially hydrolyzed polyvinyl ester, commonly referred to as "Formvar."

I have found, however, that if the wire mesh is first coated with a thin gelatin or polyvinyl formal plastic film and then immersed in a glycerine solution, the resultant membrane is extremely impervious to air while it retains its high permeability to water. Evidently, the gelatin or plastic film serves as a matrix of fine pores which are filled by the glycerine film to prevent the passage of air. Moisture, such as water, however, is quite soluble in glycerine and dissolves from the atmosphere into the exposed side of the glycerine and evaporates out of the other side of the glycerine into the pressure chamber.

In the operation of my invention it is necessary only to evacuate the atmospheric gases from the pressure chamber of the instrument. Thereafter the water vapor flows through the membrane 6 until the internal vapor pressure is equal to the external vapor pressure of the atmosphere. When employed in conjunction with a manometer type pressure instrument the consequent displacement of the liquid within the manometer from its own level is a direct measure of this vapor pressure and may be calibrated to indicate the absolute humidity of the external atmosphere. Similarly, when employed in conjunction with an aneroid type pressure instrument the constriction of the pressure sensitive compartment within the evacuated chamber is also directly responsive to this vapor pressure and the resultant movement of the pointer may be calibrated. It is apparent that once an equilibrium of internal and external vapor pressures is attained, there is a subsequent continuous indication of any variations in humidity as moisture is transferred back and forth through the membrane. In addition, the gas leakage is so small that accurate readings are obtainable for several weeks before it becomes necessary to re-evacuate the pressure measuring instrument.

It will be appreciated that the moisture transferring properties of a membrane, such as described above, will be comparatively unaffected by changes in temperature or pressure, such as are normally encountered in the general atmosphere in which we live, and that the above-described humidity indicating instruments are therefore ideally suited for weather indication or for humidity indication within a particular room. If a knowledge of the relative humidity is desired, it is necessary only to compare the absolute reading of the instrument to the known 100% saturation humidity at the particular temperature of the atmosphere concerned.

Although I have described the construction of particular novel semi-permeable membranes suitable for use with my invention, other semi-permeable materials are well known and may be employed in various combinations by those skilled in the art to provide other membranes having the desirable properties outlined above. It is to be understood, therefore, that I intend by the appended claims to cover not only the particular membranes described but also the application of all such membranes to humidity measuring instruments in accordance with the true spirit and scope of my invention.

What I claim as new and desire to secure by Letters Patent of the United States is:

1. A moisture-measuring instrument comprising a gas evacuated chamber having an opening therein, a pressure sensitive element within said chamber, and a membrane permeable to moisture but substantially impervious to gases covering said said opening.

2. A humidity-measuring instrument comprising a pressure measuring instrument having a pressure sensitive element within a gas evacuated chamber, and a membrane covering an opening in an external wall of said chamber, said membrane being permeable to moisture but substantially impervious to air.

3. A humidity-measuring instrument comprising a gas evacuated chamber, a pressure sensitive element within said chamber, a tube leading into the chamber for evacuation of gases therein, and a membrane entirely covering an opening in the walls of said tube, said membrane including a fine wire mesh covered with a material permeable to moisture but substantially impervious to gases.

4. An absolute humidity-measuring instrument comprising a manometer having a closed end and an open end, a semi-permeable membrane completely covering said open end, said membrane being permeable to water but substantially impervious to air, and means communicating with said manometer to enable the evacuation of gases within said manometer.

5. An absolute humidity-measuring instrument comprising a U-shape manometer tube having a closed end and an open end, a nonvolatile liquid within said tube, a semi-permeable membrane completely covering said open end, said membrane being permeable to water but substantially impervious to air, and means communicating with said manometer to enable the evacuation of gases within said manometer.

6. A humidity-measuring instrument comprising an aneroid-type atmospheric pressure-measuring instrument having a chamber enclosing an evacuated pressure sensitive element, a tube opening into said chamber and having a pressure receiving mouth in the wall thereof, a membrane entirely covering said mouth, said membrane being permeable to moisture but substantially impervious to air, and valve means communicating with the interior of said instrument to enable the evacuation of gases from said chamber and said tube.

7. A humidity-measuring instrument comprising a pressure-measuring instrument having a gas evacuated chamber and a pressure sensitive element within said chamber, and a membrane covering an opening leading into said chamber, said membrane including a fine mesh, a polyvinyl formal plastic film covering said mesh, and a glycerine film impregnating said plastic film.

8. A humidity-measuring instrument comprising a gas evacuated chamber, a pressure sensitive element within said chamber, a conduit leading from the external atmosphere into said chamber, and a membrane entirely covering the external mouth of said conduit, said membrane including a fine mesh covered with a gelatin film, and a glycerine film coating said gelatin film.

9. An absolute humidity-measuring instrument comprising, a manometer tube having a closed end and an open end, a non-volatile liquid partially filling said tube, a membrane completely covering said open end, said membrane comprising a fine wire mesh covered with a thin polyvinyl formal plastic film impregnated with a glycerine film, and means communicating with said manometer to enable the evacuation of gases therefrom.

10. An absolute humidity-measuring instrument comprising, a manometer tube having a closed end and an open end, a non-volatile liquid partially filling said tube, a membrane completely covering said open end, said membrane comprising a fine wire mesh, a thin gelatin film covering said mesh and a glycerine film covering said gelatin film, and means communicating with said manometer to enable the evacuation of gases therefrom.

11. An absolute humidity-measuring instrument comprising an evacuated manometer having a closed and an open end, and a semi-permeable membrane completely covering said open end, said membrane including a fine wire mesh and a material permeable to moisture but substantially impervious to gases covering said mesh.

12. An absolute humidity-measuring instrument comprising an aneroid type atmospheric pressure-measuring instrument having an evacuated pressure chamber enclosing an evacuated pressure sensitive element, and a membrane entirely covering an opening leading into said pressure chamber, said membrane including a fine wire mesh covered with material permeable to moisture but substantially impervious to gases.

BERNARD VONNEGUT.

REFERENCES CITED

The following references are of record in the file of this patent:

UNITED STATES PATENTS

| Number | Name | Date |
| --- | --- | --- |
| 1,779,847 | Jacobsohn | Oct. 28, 1930 |
| 2,047,638 | Kott | July 14, 1936 |
| 2,143,775 | Hertel | Jan. 10, 1939 |
| 2,255,734 | McGrath | Sept. 9, 1941 |
| 2,469,537 | Wohrer | May 10, 1949 |

OTHER REFERENCES

Publication—Chemistry and Industry, Dec. 8, 1933, p. 990. (A copy is in Div. 30, Class 297–1.)